United States Patent
Miura et al.

(10) Patent No.: US 8,233,267 B2
(45) Date of Patent: Jul. 31, 2012

(54) CAPACITOR WITH DEFINED TERMINAL PLATE AND HOUSING JOINT AREAS

(75) Inventors: Teruhisa Miura, Kyoto (JP); Shusaku Kawasaki, Osaka (JP)

(73) Assignee: Panasonic Corporation, Osaka (JP)

( * ) Notice: Subject to any disclaimer, the term of this patent is extended or adjusted under 35 U.S.C. 154(b) by 396 days.

(21) Appl. No.: 12/525,636

(22) PCT Filed: Jan. 23, 2008

(86) PCT No.: PCT/JP2008/000064
§ 371 (c)(1),
(2), (4) Date: Aug. 3, 2009

(87) PCT Pub. No.: WO2008/096520
PCT Pub. Date: Aug. 14, 2008

(65) Prior Publication Data
US 2010/0033900 A1    Feb. 11, 2010

(30) Foreign Application Priority Data
Feb. 8, 2007   (JP) ................. 2007-028912

(51) Int. Cl.
*H01G 4/32*   (2006.01)
*H01G 4/005*   (2006.01)
*H01G 4/228*   (2006.01)

(52) U.S. Cl. ............. 361/511; 361/301.5; 361/303; 361/306

(58) Field of Classification Search ........ 361/301.5, 361/303, 306, 511
See application file for complete search history.

(56) References Cited

U.S. PATENT DOCUMENTS
5,168,019 A * 12/1992 Sugeno .............. 429/231.95
(Continued)

FOREIGN PATENT DOCUMENTS
JP     2001-160387 A    6/2001
(Continued)

OTHER PUBLICATIONS
International Search Report for PCT/JP2008/000064.

*Primary Examiner* — Eric Thomas
*Assistant Examiner* — Arun Ramaswamy
(74) *Attorney, Agent, or Firm* — Pearne & Gordon LLP

(57) ABSTRACT

The capacitor includes element (1) provided with electrodes at its both ends; metal case (2) with cathode electrode (1*c*) of element (1) joined to a joint part on the inner bottom surface of metal case (2), containing cathode electrode (1*c*); and a terminal plate with anode electrode (1*b*) of element (1) joined to a joint part on the inner surface of the terminal plate, sealing the opening of metal case (2). S1<S2<S3 holds, where S1 is the area of joint part (2*a*) of metal case (2); S2 is the area of joint part (3*a*) of the terminal plate; S3 is the touching area of the inner bottom surface and element (1), excluding joint part (2*a*) of metal case (2). When the terminal plate arranged on element (1) inside metal case (2) is pressurized, joint part (2*a*) of metal case (2) crushes cathode electrode (1*c*) of element (1), and then joint part (3*a*) of the terminal plate crushes anode electrode (1*b*) of element (1). Accordingly, both electrodes (1*b*, 1*c*) of element (1) can be laser-welded stably in a desired crush amount, thereby improving reliability of joining.

7 Claims, 4 Drawing Sheets

U.S. PATENT DOCUMENTS

| | | |
|---|---|---|
| 6,692,863 B1 | 2/2004 | Nakanishi et al. |
| 2002/0142211 A1 | 10/2002 | Nakanishi et al. |
| 2004/0128826 A1 | 7/2004 | Nakanishi et al. |
| 2004/0131930 A1 | 7/2004 | Nakanishi et al. |
| 2004/0247998 A1 | 12/2004 | Nakanishi et al. |
| 2006/0281252 A1 * | 12/2006 | Oversteyns .................. 438/253 |

FOREIGN PATENT DOCUMENTS

| | | |
|---|---|---|
| JP | 2006-173440 A | 6/2006 |
| JP | 2006-351981 A | 12/2006 |

* cited by examiner

PRIOR ART

PRIOR ART

CAPACITOR WITH DEFINED TERMINAL PLATE AND HOUSING JOINT AREAS

TECHNICAL FIELD

The present invention relates to a capacitor used for regeneration in electronic appliances and hybrid cars, and for power storage.

BACKGROUND ART

FIG. 2 is a developed view for showing the internal structure of element 11 (not shown) of this type of conventional capacitor. Element 11 has the following structure. That is, a pair of electrodes (positive and negative) have polarizable electrode layer 25 formed on collector 27 made of aluminum foil. The electrodes are displaced in the reverse direction to each other, separator 26 is interposed between them, and they are rolled up. A part of collector 27 where polarizable electrode layer 25 is not formed is an unformed part of the polarizable electrode layer, and part of it becomes positive electrode 21b and negative electrode 21c. FIG. 3 is a sectional view showing the structure of a conventional capacitor. In FIG. 3, element 11 has hollow 11a. From both end surfaces of element 11, positive and negative electrodes are extracted respectively. Element 11, together with a driving electrolyte (not shown), is contained in based, cylindrical metal case 12 made of aluminum. Metal case 12 has projection 12a provided integrally on the inner bottom surface of metal case 12 so as to fit into hollow 11a of element 11. This projection 12a is fitted into hollow 11a of element 11 and is inserted into metal case 12. Then, the end face of element 11 at the negative electrode is joined to the inner bottom surface of metal case 12 by laser welding mechanically and electrically. Terminal plate 13 made of aluminum is joined to the end face of element 11 at the positive electrode and disposed at the opening of metal case 12 for sealing.

FIGS. 4A, 4B, 4C, and 4D are a perspective view showing the structure of terminal plate 13 used for a conventional capacitor, viewed from an outer surface side; a perspective view of the same, viewed from an inner surface side; a sectional view taken along 4C-4C in FIG. 4B; and a sectional view taken along 4D-4D in FIG. 4B, respectively. This terminal plate 13 has the following structure. That is, the inner surface of element 11 where the end face at the positive electrode is joined is base level D (refer to FIG. 4D). The base level, except for outer circumference 13a and plural joint parts 13b strip-shaped running from this outer circumference 13a toward the center, is upraised toward the outer surface. To assemble the capacitor, joint part 13b is joined to the end face of element 11 at the positive electrode by laser welding mechanically and electrically.

The center of the inner surface of this terminal plate 13 is provided therein with projection 13c fitting into hollow 11a of element 11. Further, the outer surface of this terminal plate 13 is provided thereon with anode terminal 13d for connecting to the outside. Additionally, step 13e for inserting sealing rubber 15 (described later) is provided on the outer circumference at the outer surface circularly, and projection 13f is provided substantially in the center of this step 13e circularly, respectively. Terminal plate 13 further includes antirotation part 13g placed at the outer surface and safety valve mount hole 13h (the safety valve is not shown) doubling as an electrolyte inlet.

A capacitor is produced in the following way. That is, in FIG. 3, projection 13c provided on the inner surface of terminal plate 13 is inserted into hollow 11a of element 11, and then the end face of element 11 at the positive electrode is joined to joint part 13b by laser welding. This terminal plate 13 is disposed at the opening of metal case 12 with insulating member 14 interposed. With sealing rubber 15 arranged on the circumference of the outer surface of terminal plate 13, the open end of metal case 12 undergoes curling so as to pressure-weld sealing rubber 15.

In a conventional capacitor thus produced, the base level of terminal plate 13 corresponds to the joint part joined to the end face of element 11 at the positive electrode, which allows the distance from the end face of element 11 at the positive electrode to the top end of metal case 12 after being processed to be extremely short. As a result, the height of element 11 can be made higher than other capacitors with the same height, thereby increasing capacitance and decreasing resistance.

As information on prior art documents related to the invention of the application, patent literature 1 for example is known.

In a conventional capacitor, the end faces of element 11 at the positive and negative electrodes are joined to the inner surface of terminal plate 13 and the inner bottom surface of metal case 12, respectively, by laser welding. The joint part is joined by laser welding in a state where the end face at the positive electrode is partially crushed by pressing plural strip-shaped joint parts 13b provided on the inner surface of terminal plate 13 (although not shown, the inner bottom surface of metal case 12 is formed similarly) against the end face of element 11 at the positive electrode.

A concrete production method is as the following. That is, element 11 is inserted into metal case 12. Subsequently, terminal plate 13 is arranged at the opening of metal case 12. By pressurizing this terminal plate 13, a joint part provided on the inner bottom surface of metal case 12 partially crushes the end face of element 11 at the negative electrode, and joint part 13b provided on the inner surface of terminal plate 13 partially crushes the end face of element 11 at the positive electrode. After that, laser welding is performed.

Accordingly, the quality of laser welding is susceptible to the extent to which the end faces of element 11 at the positive and negative electrodes are crushed in a desired shape and desired dimensions. However, the state where the end faces of element 11 at the positive and negative electrodes are crushed cannot be monitored from their appearance, which means the joining state after laser welding and its strength cannot be controlled. As a result, a poor crushing state of the end faces of element 11 at the positive and negative electrodes causes variation in joining by laser welding, which results in insufficient welding points to increase the resistance of extracting an electrode and of connection. Consequently, when a charge-discharge load is exerted on a capacitor, the product generates a lot of heat, thus decreasing the product life.

[Patent literature 1] Japanese Patent Unexamined Publication No. 2006-173440

SUMMARY OF THE INVENTION

The present invention provides a capacitor that solves conventional problems; joins the element to the terminal plate and metal case well accurately to present superior reliability in joining. The present invention includes an element with a pair of electrodes formed on its both ends; a metal case containing the element together with a driving electrolyte, with one electrode of the element joined to a joint part convexly provided on the inner bottom surface of the metal case; and a terminal plate with the other electrode of the element joined to a joint part convexly provided on the inner surface of the terminal plate, sealing the opening of the metal case. The capacitor is produced so that S1<S2<S3 holds, where S1 is the area of the joint part joined to the element, provided on the inner bottom surface of the metal case; S2 is the area of the joint part joined to the element, provided on the inner surface of the terminal plate; and S3 is the touching area of the inner bottom surface of the metal case and the element, excluding the joint part joined to the element, provided on the inner bottom surface of the metal case.

With the above-described structure, when the terminal plate is arranged on the element inserted into the metal case, and this terminal plate is pressurized to compress the element, a force when compressed is exerted on from the smallest part to larger ones in sequence. As a result, the joint part convexly provided on the inner bottom surface of the metal case first crushes part of the end face of the element at the negative electrode by the projection height of the convex joint part. Subsequently, the remaining part of the end face at the negative electrode not crushed touches the inner bottom surface of the metal case. Then, the joint part convexly provided on the inner surface of the terminal plate crushes part of the end face of the element at the positive electrode by a given length. Accordingly, both the end faces of the element at the positive and negative electrodes can be easily crushed by a given length, thus allowing a stable joint part to be formed by laser welding. Consequently, an advantage is available in that a highly reliable capacitor is implemented that suppresses heat generated by the product with a large amount of current charged and discharged, to prevent life deterioration and characteristic degradation.

REFERENCE MARKS IN THE DRAWINGS

Figure 1A:
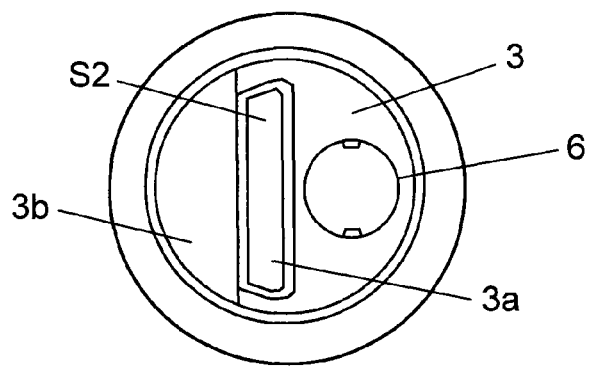
FIG. 1A is a plan view showing the structure of a capacitor according to an exemplary embodiment of the present invention.

1 Element
1a Hollow
1b Anode electrode
1c Cathode electrode
2 Metal case
2a, 3a Joint part
2b Drawn part
3 Terminal plate
3b Terminal
4 Insulating member
5 Sealing rubber
6 Pressure-regulating valve

DETAILED DESCRIPTION OF PREFERRED EMBODIMENT

Figure 1B:
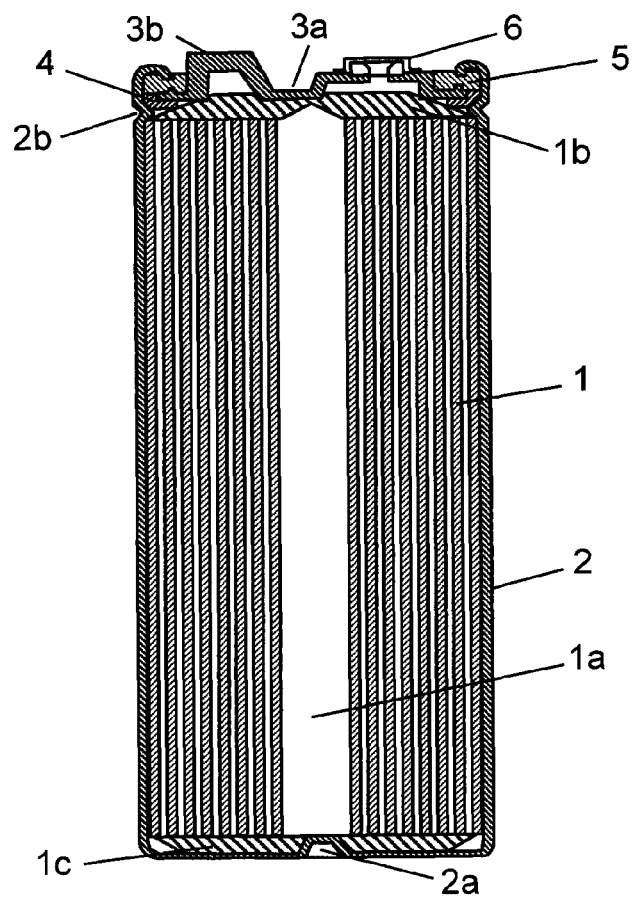
FIG. 1B is a sectional elevational view showing the structure of the capacitor according to an exemplary embodiment of the present invention.
Figure 1C:
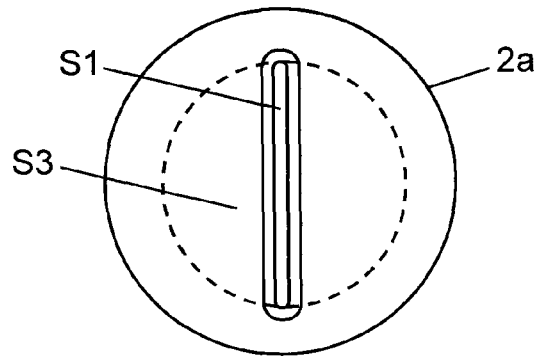
FIG. 1C is a bottom view showing the structure of the capacitor according to an exemplary embodiment of the present invention.
Figure 2:
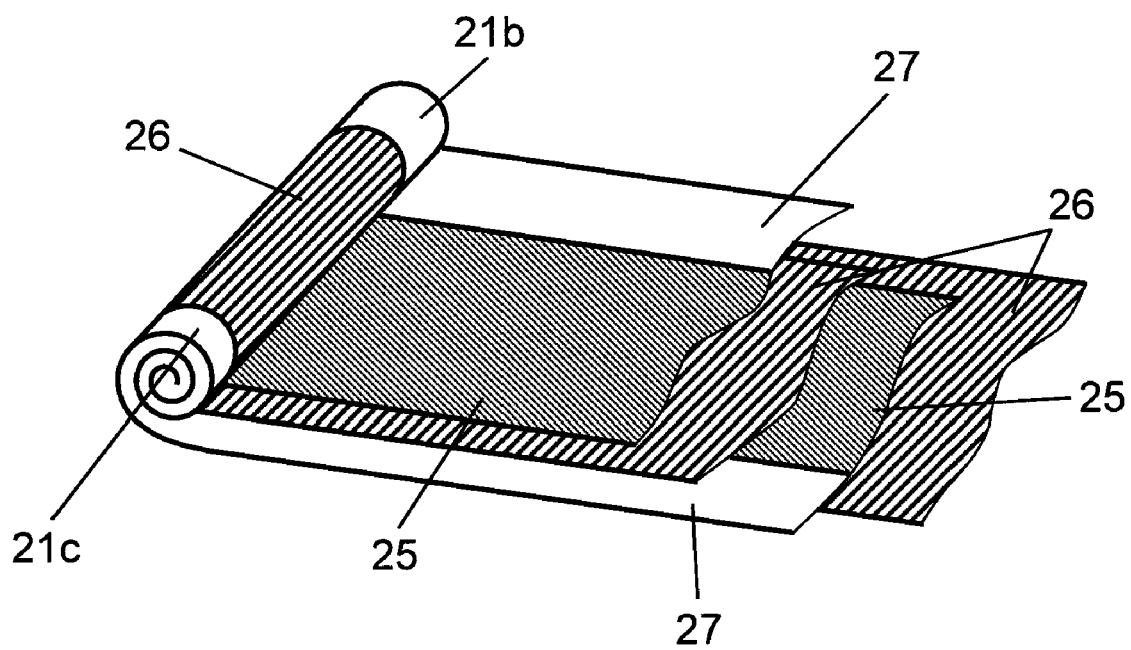
FIG. 2 is a developed view showing the structure of a conventional capacitor.
Figure 3:
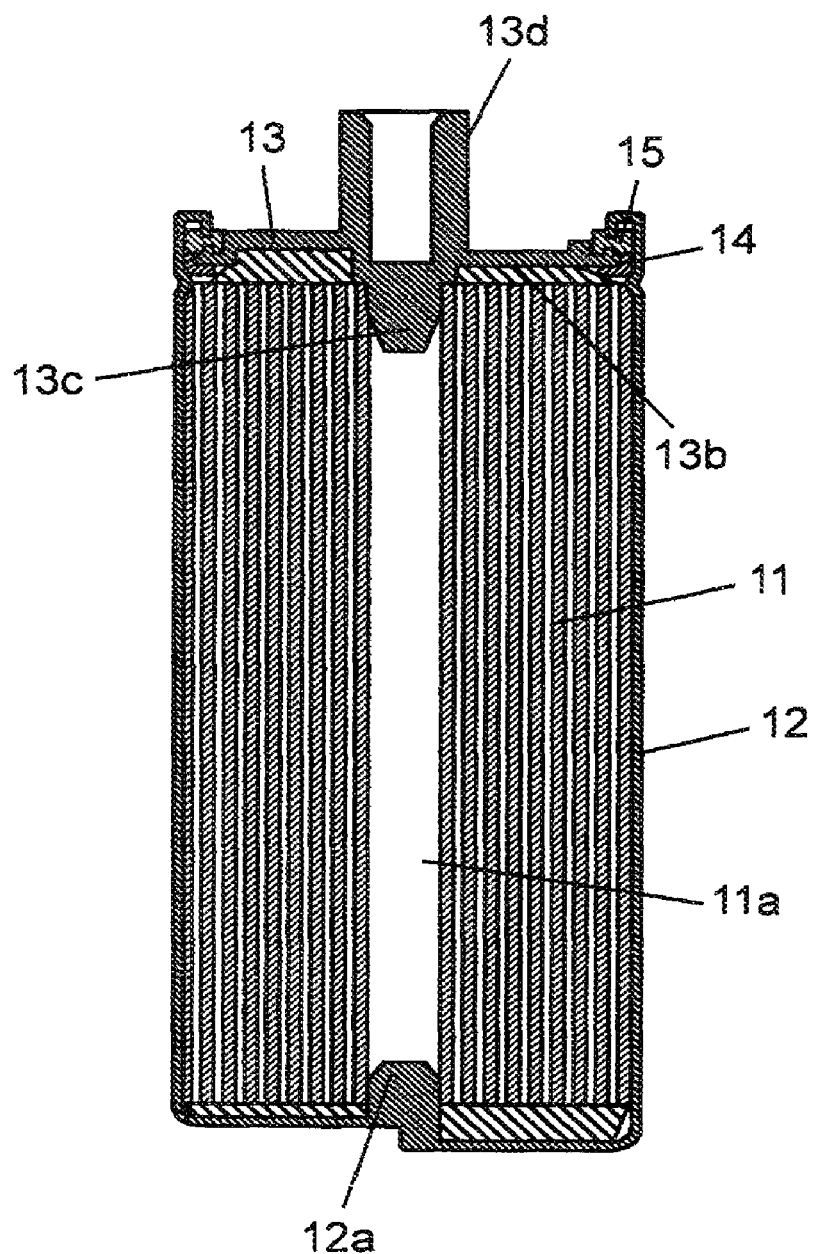
FIG. 3 is a sectional view showing the structure of the conventional capacitor.
Figure 4A:
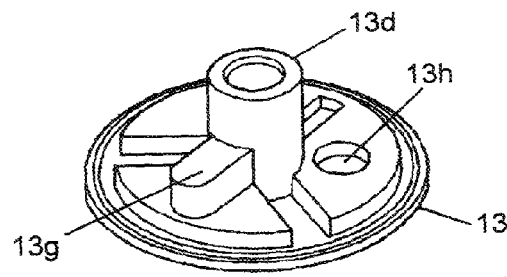
FIG. 4A is a perspective view showing the structure of a terminal plate used for a conventional capacitor, viewed from an outer surface side.
Figure 4B:
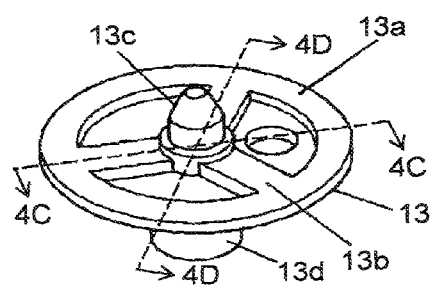
FIG. 4B is a perspective view showing the structure of the terminal plate used for a conventional capacitor, viewed from an inner surface side.
Figure 4C:
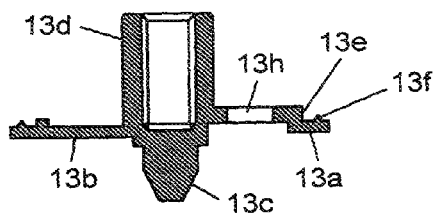
FIG. 4C is a sectional view of the terminal plate used for a conventional capacitor, taken along line 4C-4C.
Figure 4D:
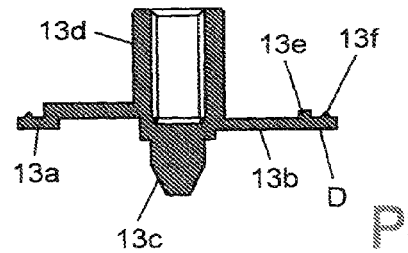
FIG. 4D is a sectional view of the terminal plate used for a conventional capacitor, taken along line 4D-4D.

FIGS. 1A, 1B, 1C are a plan view, sectional elevational view, and bottom view, respectively, showing the structure of a capacitor according to an exemplary embodiment of the present invention. Element 1 has the same structure as that of a conventional one. Specifically, element 1 is structured as described below. That is, a pair of electrodes (positive and negative) have a polarizable electrode layer formed on a collector (except for one end) made of aluminum foil. The electrodes are stacked in the reverse direction to each other and rolled up with a separator interposed therebetween so that parts of the positive and negative electrodes where each polarizable electrode layer is not formed are exposed on each end face facing the other. Then, anode electrode 1b and cathode electrode 1c are extracted from both end surfaces of this element 1. The center is provided therein with hollow 1a.

Metal case 2 is a bottomed, cylindrical case made of aluminum containing element 1 together with a driving electrolyte (not shown). Joint part 2a provided so as to convexly project in a strip shape on the inner bottom surface of this metal case 2 crushes cathode electrode 1c provided on one end face of element 1 inserted into metal case 2. This joint part 2a is laser-welded by being irradiated with laser light from the outside to join metal case 2 to cathode electrode 1c of element 1 mechanically and electrically.

Terminal plate 3 made of aluminum has joint part 3a placed so as to project in a strip shape roughly in the center of the inner surface of terminal plate 3 and terminal 3b for external connection. Joint part 3a crushes anode electrode 1b placed on the other end face of element 1, and this joint part 3a is laser-welded by being irradiated with laser light from the outside to join joint part 3a mechanically and electrically to extract the positive electrode of element 1 from terminal plate 3.

Insulating member 4, with an L-shaped cross section, ring-shaped, disposed between the outer circumferential surface of terminal plate 3 and the inner circumferential surface of metal case 2 to insulate them from each other is positioned by horizontally drawing the outer circumferential surface of metal case 2 at drawn part 2b. Sealing rubber 5, disposed on the circumference of the top surface of terminal plate 3 described above, is compressed by curling the open end of metal case 2 for sealing. Pressure-regulating valve 6 is provided so as to block a communicating hole for electrolyte injection provided in terminal plate 3 described above.

A more concrete description is made of a capacitor according to the embodiment thus structured. First, element 1 is produced in diameter 25 mm by length 130 mm, and anode electrode 1b and cathode electrode 1c are 4 mm in height, respectively. Joint part 2a provided so as to project in a strip shape in the center of the inner bottom surface of metal case 2 is 3 mm in width, 22 mm in length, and 0.2 to 0.8 mm in projection height. Herewith, area S1 of joint part 2a is 66 mm$^2$.

The projection height of 0.2 to 0.8 mm is made same as the height by which cathode electrode 1c of element 1 deforms by touching the bottom surface and being pressure-welded to the bottom surface when assembled. If shorter, the joint strength of laser welding may weaken by the deficit. If longer, a welded part breaks into element 1, causing characteristic degradation such as a capacitance decrease.

Joint part 3a provided so as to project in a strip shape roughly in the center of the inner surface of terminal plate 3 is 4 mm in width, 22 mm in length, and apparently zero in projection height, which is because joint part 3a is made level with the outer circumference (base level) of terminal plate 3. However, the part other than joint part 3a is upraised toward the outer surface, and thus only joint part 3a projects actually. Herewith, area S2 of joint part 3a is 88 mm².

S3, which is the touching area of the inner bottom surface of metal case 2 and element 1, excluding joint part 2a joined to element 1, provided on the inner bottom surface of metal case 2, is the area (491 mm², inside the dotted line in FIG. 1C) of element 1−area S1 (66 mm²) of joint part 2a=425 mm², and S1<S2<S3 holds.

Accordingly, when producing a capacitor according to the embodiment, element 1 is inserted into metal case 2, terminal plate 3 is arranged on this element 1, and this terminal plate 3 is pressurized toward the inner bottom surface of metal case 2 to partially crush anode electrode 1b and cathode electrode 1c of element 1. At this moment, a part on which the heaviest load per unit area is exerted is crushed first, and thus the crushing amount of S1 and S2 can be controlled according to the relationship between each area described above.

More specifically, joint part 2a provided on the inner bottom surface of metal case 2 crushes part of cathode electrode 1c of element 1. Subsequently, the remaining part of cathode electrode 1c of element 1 not crushed touches the inner bottom surface of metal case 2. Then, joint part 3a provided on the inner surface of terminal plate 3 crushes part of anode electrode 1b of element 1 to complete the process. Hence, the crush amount of cathode electrode 1c and anode electrode 1b can be controlled to an arbitrary amount by settings of the area and height of joint part 2a provided on the inner bottom surface of metal case 2 and joint part 3a provided on the inner surface of terminal plate 3; and the distance between the outer bottom surface of metal case 2 and the outer surface of terminal plate 3, before and after compression. Consequently, the minimum overlap thickness of collectors can be ensured required to prevent melting of the collectors.

Herewith, laser welding can be performed after part of anode electrode 1b and cathode electrode 1c of element 1 is crushed in a given shape and given dimensions, and to prevent melting of the collectors, the minimum overlap thickness (for a terminal plate and a case made of aluminum, and for a collector made of aluminum foil, the overlap thickness of collectors is approximately more than 10% of the thickness of the outer member directly irradiated with laser light) of collectors can be ensured, thereby stabilizing the laser welding process. Accordingly, special effects are presented in that a highly reliable capacitor is available that stabilizes joining quality, suppresses heat generated by the product even with a large amount of current charged and discharged, to prevent life deterioration and characteristic degradation.

Joint part 2a on the bottom surface is 3 mm in width, 22 mm in length, and 0.2 to 0.8 mm in projection height, where the length of 22 mm contacts the diameter part of the end face of element 1 nearly evenly. When element 1 is assembled, part of cathode electrode 1c is crushed after the element is inserted into the case, where the element is preliminarily processed so as to make the diameter of the end face of the element smaller by inclining part of the collector projecting on both end surfaces of the element to the inner circumferential direction, so as to deform to decrease the diameter. With this structure, the longitudinal part of the joint part results in being welded to the cathode electrode on the nearly entire area of the diameter part of element 1. The characteristic of the capacitor is improved if the joint part on the bottom surface is welded to the cathode electrode on the nearly entire circumference of cathode electrode 1c rolled up. This is because a current flowing through a path detouring when charging and discharging decreases, reducing inductance and resistance components.

Joint part 3a provided so as to project in a strip shape substantially in the center of the inner surface of terminal plate 3 is 4 mm in width and 22 mm in length, where the length of 22 mm contacts the diameter part of element 1 nearly evenly (same as the bottom surface described above), which presents the effects same as the above.

In order to simply make the relationship between each area to be S1<S2<S3, narrowing the range of irradiating laser light for laser welding can implement the relationship even for a planate bottom surface and a planate terminal surface. However, if the end face of the element is made touch a welded part not in a projecting shape as in the present invention, but in a planate shape, the overlapping state of collectors projecting from the end face of the element is difficult to control, which disables welding in a high dimensional accuracy. However, providing a projection of the present invention implements stable laser processing.

In this embodiment, joint part 2a projecting on the bottom surface and projecting part 3a of the terminal plate are in a straight line, respectively. A simple shape brings about laser welding process in a short time with high reliability.

Industrial Applicability

A capacitor according to the present invention presents effects in that the element is joined to the terminal plate and metal case well accurately to present superior reliability, useful in such as the automobile field requiring a particularly severe operation environment.

The invention claimed is:
1. A capacitor comprising:
an element produced in a way in which a pair of positive and negative electrodes having a polarizable electrode layer formed on a collector, except on one end thereof, made of metal foil, are stacked in a reverse direction to each other, and the pair of positive and negative electrodes are rolled up with a separator interposed therebetween, which causes an unformed part of the polarizable electrode layer on each of the positive and negative electrodes to be exposed on each end face facing the other to form a pair of electrode extraction parts;
a bottomed, cylindrical metal case containing the element together with a driving electrolyte, and with one electrode of the element joined to a joint part convexly provided on an inner bottom surface of the metal case;
a terminal plate with an other electrode of the element joined to a joint part convexly provided on an inner surface of the terminal plate, sealing an opening of the metal case,
wherein S1<S2<S3 holds, where S1 is an area of the joint part joined to the element, provided on the inner bottom surface of the metal case; S2 is an area of the joint part joined to the element, provided on the inner surface of the terminal plate; and S3 is a touching area of the inner bottom surface of the metal case and the element, excluding the joint part joined to the element, provided on the inner bottom surface of the metal case.

2. The capacitor of claim 1, wherein at least one of a longitudinal side of the joint part joined to the element, provided on the inner bottom surface of the metal case;
and a longitudinal side of the joint part joined to the element, provided on the inner surface of the terminal plate, contacts a diameter part of the element.

3. The capacitor of claim 1, wherein a projection height of the joint part joined to the element, provided convexly on the inner bottom surface of the metal case is equal to a height by which the element touching the joint part and pressure-welded to the joint part deforms.

4. The capacitor of claim 1, wherein joining of the joint part joined to the element, provided on the inner bottom surface of the metal case; and joining of the joint part joined to the element, provided on the inner surface of the terminal plate, are performed by laser welding.

5. The capacitor of claim 1, wherein at least one of the joint part provided convexly on the inner bottom surface and the joint part provided convexly on the inner surface of the terminal plate is in a straight line.

6. The capacitor of claim 1, wherein the joint part provided on the inner bottom surface of the metal case is in a strip shape.

7. The capacitor of claim 1, wherein the joint part provided on the inner surface of the terminal plate is in a strip shape.

* * * * *